United States Patent
Baumann et al.

(10) Patent No.: US 10,950,833 B2
(45) Date of Patent: Mar. 16, 2021

(54) BATTERY PACKAGING ASSEMBLY WITH SAFETY FEATURES TO REDUCE THERMAL PROPAGATION

(71) Applicant: Caterpillar Inc., Deerfield, IL (US)

(72) Inventors: Jonathan M. Baumann, Hanna City, IL (US); Justin D. Middleton, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 94 days.

(21) Appl. No.: 16/235,012

(22) Filed: Dec. 28, 2018

(65) Prior Publication Data

US 2020/0212384 A1    Jul. 2, 2020

(51) Int. Cl.
*H01M 2/10*    (2006.01)
*H01M 2/12*    (2006.01)

(52) U.S. Cl.
CPC ....... *H01M 2/1077* (2013.01); *H01M 2/1264* (2013.01); *H01M 2200/10* (2013.01)

(58) Field of Classification Search
CPC ............. H01M 10/052; H01M 10/058; H01M 2/1077; H01M 2/1264
See application file for complete search history.

(56) References Cited

U.S. PATENT DOCUMENTS

| | | |
|---|---|---|
| 8,367,239 B2 | 2/2013 | Hermann |
| 8,956,747 B2 | 2/2015 | Itoi et al. |
| 2013/0143074 A1* | 6/2013 | Kim .................... B29C 45/1676 429/7 |
| 2015/0214524 A1 | 7/2015 | Takasaki et al. |
| 2016/0248061 A1 | 8/2016 | Brambrink et al. |
| 2016/0359206 A1* | 12/2016 | Eberleh ............ H01M 10/4257 |
| 2018/0212222 A1 | 7/2018 | Barton et al. |

* cited by examiner

*Primary Examiner* — Olatunji A Godo
(74) *Attorney, Agent, or Firm* — von Briesen & Roper, s.c.

(57) ABSTRACT

A battery packaging assembly having safety features that reduce the risk of thermal propagation is disclosed. The battery packaging assembly may include a foam layer having a plurality of cutout trenches, the foam layer configured to engage battery cells in a press-fit relationship. In addition, the battery packaging assembly may include a tray configured to receive the foam layer, the tray enclosing a compartment configured for receiving a plurality of battery cells. Further, the battery packaging assembly may include a ventilation cavity in fluid communication with the plurality of trenches of the foam layer.

20 Claims, 6 Drawing Sheets

BATTERY PACKAGING ASSEMBLY WITH SAFETY FEATURES TO REDUCE THERMAL PROPAGATION

TECHNICAL FIELD

The present disclosure relates generally to a battery packaging assembly and, more particularly, relates to a battery packaging assembly having safety features that reduce the potential for thermal propagation.

BACKGROUND

Any number of battery cells may be combined to form a battery module, the battery cells being surrounded by a battery module housing. And in turn, a plurality of such battery modules may be combined in another housing or assembly to form a battery pack. Such battery packs are increasingly used in mobile and stationary applications. Uses include hybrid and electric drive vehicles, as well as stationary power generation. For example, a machine such as a hydraulic excavator, an articulated truck, a locomotive or a generator may be powered by large battery packs carried onboard. Battery powered electric drive machines may be particularly advantageous in underground mining applications where they may reduce the required mine ventilation and cooling, thereby making viable the extraction of ore bodies that would not be economically feasible with diesel powered machines. Mobile applications require secure packaging of battery packs due to the shock and vibration introduced by movement of the vehicle over roads or terrain; and heavy-duty applications such as underground mining and construction require an even higher amount of protection.

High amounts of battery energy are built into such heavy-duty equipment in order to maximize performance and productivity. For example, lithium battery systems have successfully and safely been implemented into multiple industries. A battery management system may be required to maintain control and keep such batteries in a safe working state. For example, a control system may be employed to actively monitor cell voltage, temperature and currents, and may take action to derate power limits or open the battery contactors when necessary. The control system, control components and safety features of typical battery packs help to prevent battery cell failure, which may result in the release of high-temperature, high-intensity gases and/or flames outside of the battery, also known as thermal runaway.

Thermal runaway may be caused by a short circuit within the cell, improper cell use, physical mishandling, manufacturing defects or the exposure of the cell to extreme external temperatures. And because of the close packaging of battery cells within a battery module or pack, thermal runaway in a single battery cell is capable of triggering a thermal runaway in an adjacent battery cell if enough heat is absorbed from the initial failed cell. A single cell failure, therefore, may start a thermal runaway chain reaction throughout a battery pack causing numerous adjacent batteries fail, one after another. This is known as fire or thermal propagation, and may cause significant collateral damage to the equipment as well as endanger the safety of personnel. Patent application US 2016/0248061 to Brambrink et al. describes a battery module having a burn through safety wall through which a flame from a single failed battery may escape. Likewise, the battery pack housing of the Brambrink et al. disclosure may also have a burn through safety wall corresponding to the module safety wall, thereby allowing a flame from a failed cell to also escape the battery pack. While the Brambrink et al. design may help to avoid the corruption of battery cells adjacent a failed single cell, the Brambrink et al. design requires the burning and destruction of the safety wall material, and may allow for the escape of hot gasses or flames from the battery pack, thereby presenting the risk of additional damage to equipment outside of the battery pack.

In addition to battery packaging methods that protect battery cells from excessive vibrations and shocks that may physically damage the batteries and cause failure, it would also be advantageous to have a battery packaging design where a single cell thermal runaway is managed so as not to result in damage to adjacent, normal cells, thereby preventing thermal propagation throughout the entirety of the battery pack, and where the escaping high-heat energy is contained so as not to risk damage to other equipment components. The presently disclosed battery packaging assembly and methods address one or more of the above-described problems and/or other problems in the art.

SUMMARY

In accordance with one aspect of the present disclosure, a battery packaging assembly is disclosed. The disclosed battery packaging assembly may include a foam layer having a plurality of cutout trenches, the foam layer configured to engage battery cells in a press-fit relationship. The disclosed battery packaging assembly may further include a tray configured to receive the foam layer, the tray enclosing a compartment configured for receiving a plurality of battery cells. In addition, the battery packaging assembly may include a ventilation cavity in fluid communication with the plurality of trenches of the foam layer.

In accordance with another aspect of the present disclosure, a battery pack is disclosed. The battery pack may include a plurality of battery modules containing a plurality of battery cells. The disclosed battery pack may further include a foam layer having a plurality of cutout trenches, the foam layer configured to engage the battery modules in a press-fit relationship. In addition, the battery pack may include a tray configured to receive the foam layer, the tray enclosing a compartment configured for receiving the plurality of battery modules. Further, the battery pack may include a ventilation cavity in fluid communication with the plurality of trenches of the foam layer.

In accordance with yet another aspect of the present disclosure, a method of preventing thermal propagation in a battery pack is disclosed. The disclosed method may include the step of providing a battery pack tray configured to receive a foam layer and a plurality of battery cells. The method may also include the step of disposing a foam layer in the battery pack tray between the plurality of battery cells and the battery pack tray, the foam layer having a plurality of cutout trenches, and the foam layer configured to engage the battery cells in a press-fit relationship. Further, the method may include the step of providing a ventilation cavity in fluid communication with the plurality of cutout trenches of the foam layer, the ventilation cavity configured to receive heat energy from a failed battery cell. In addition, the method may include the step of providing multiple heat energy evacuation routes from the battery cells, through the plurality of cutout trenches of the foam layer, and into the ventilation cavity.

These and other aspects and features of the present disclosure will be better understood from the following description read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

This disclosure relates to a battery packaging assembly having safety features that minimize the risk of thermal propagation. In this disclosure, the terms "battery cell", "battery" and "cell" may be used interchangeably. The terms "battery pack" and "battery module" refer to multiple, individual batteries combined within a single or multi-part housing, or otherwise contained together. A battery pack may include multiple battery modules. Further, reference to a "battery" or "batteries" should, in some contexts, be understood as a "battery module" or "battery module housing" and vise versa. "Thermal propagation" may be used herein interchangeably with "propagation" and "fire propagation". Additionally, when referring to the failure of a battery cell, the release of high-temperature, high-intensity thermal energy from the cell may be referred to as the release of "heat energy", "hot gasses", "fire" or "flames".

Figure 1:
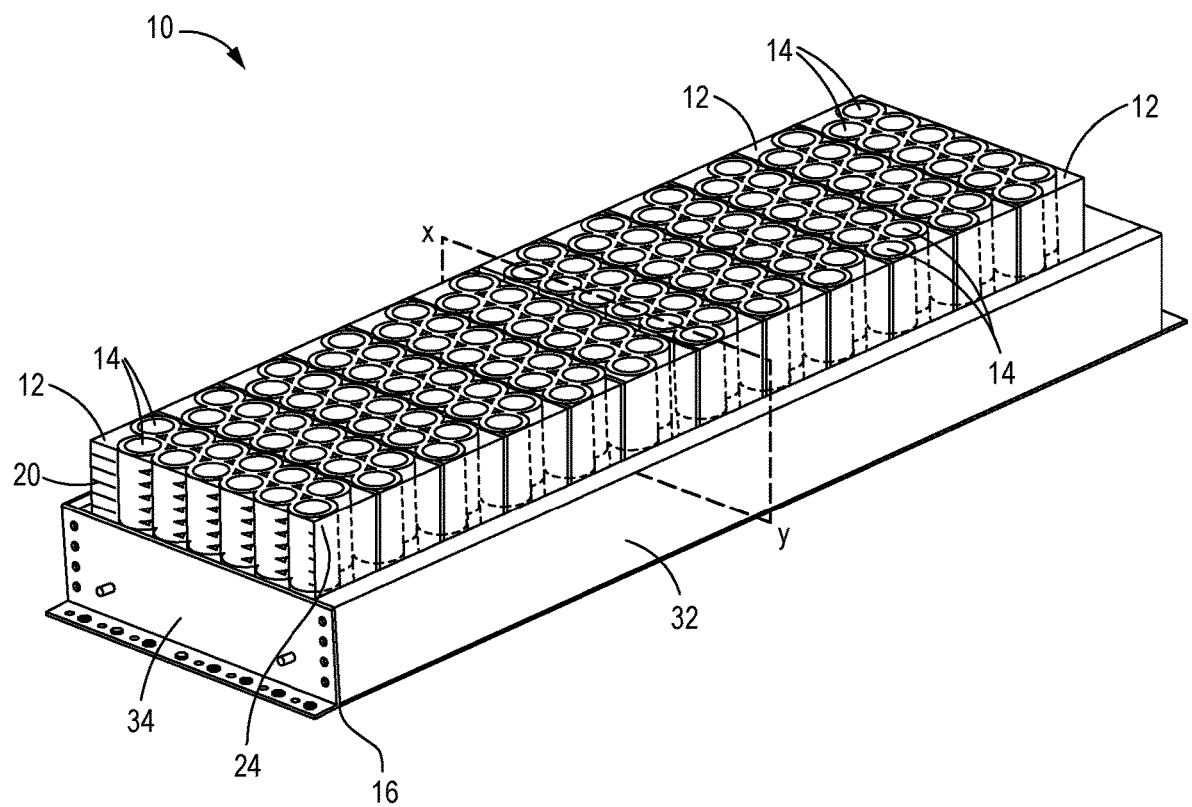
FIG. 1 is a perspective view of a battery pack, according to certain embodiments of the present disclosure.

Referring to FIG. 1, a battery pack 10 having multiple battery modules 12 and multiple battery cells 14 is shown. The battery cells 14 and modules 12 are received in a battery pack tray 16, the combination of these elements, among other things, constituting the battery pack 10. The disclosed battery pack 10 may be used in electric drive vehicles, hybrid vehicles and stationary power generators. In electric drive applications, battery packs may store energy from deceleration and provide power for traction motors in order to propel a vehicle. In hybrid applications, battery packs may store energy from deceleration and augment an engine in providing power in order to propel a vehicle. And in stationary power generator applications, battery packs may be used to augment the primary engine and generator. Large amounts of power are charged to and discharged from battery packs in these applications. When battery packs are employed in underground mining applications, they are subjected to significant shock and vibrations, which may damage the battery cells and provoke cell failure and/or thermal runaway. In order to avoid such risks, battery cells in a battery pack require protection from excessive vibrations as well as the minimization and containment of thermal runaway so as not to trigger thermal propagation throughout the battery pack.

Figure 2:
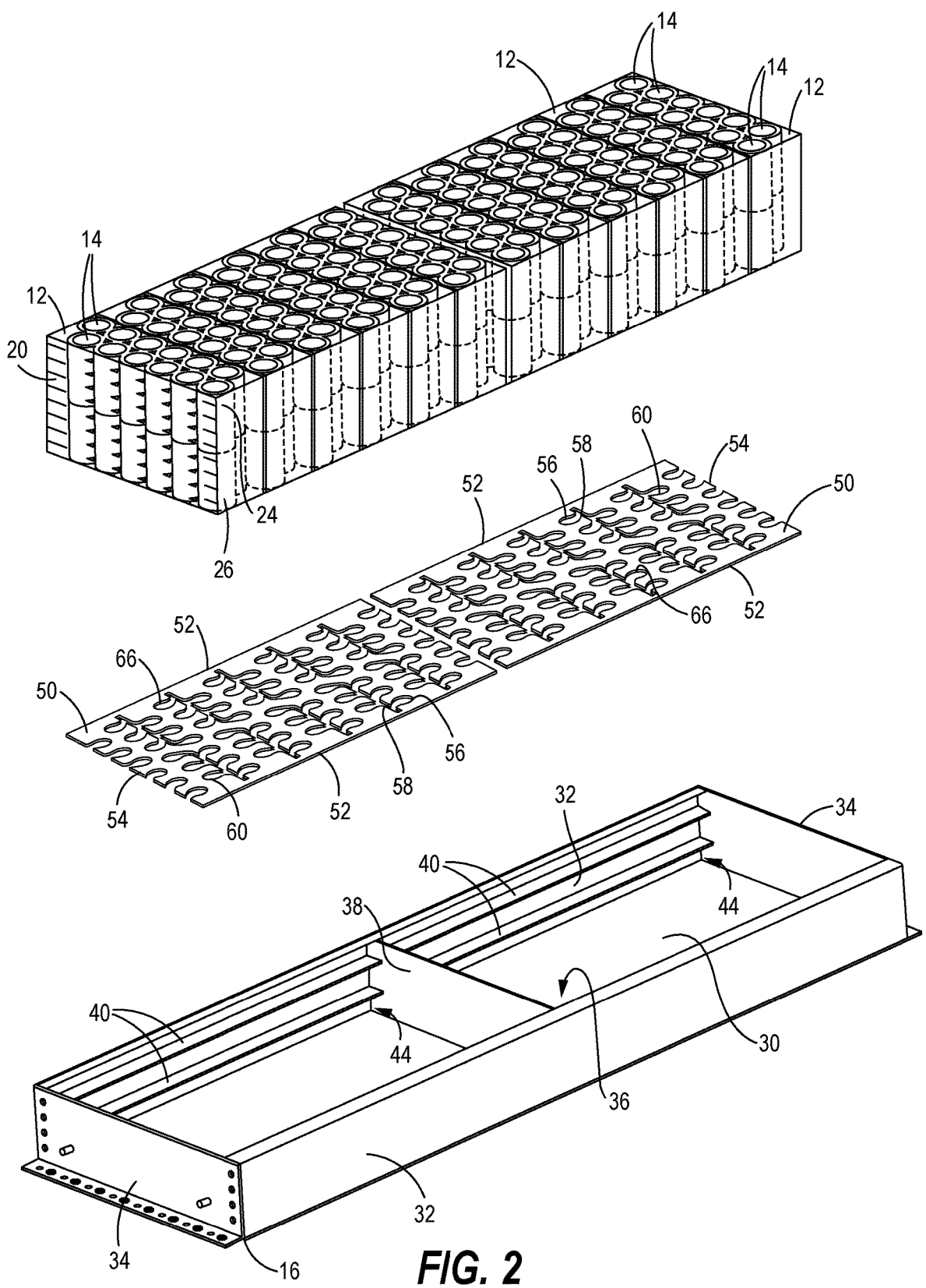
FIG. 2 is an exploded perspective view of the battery pack of FIG. 1, according to certain embodiments of the present disclosure.

In furtherance of these objectives, and as illustrated in FIGS. 1 and 2, numerous battery cells 14 may be combined and contained in a battery module 12. Likewise, numerous battery modules 12 may be combined and contained in the battery pack tray 16. Alternatively, the cells 14 may be disposed directly in the tray 16. While the illustrated battery pack 10 includes twelve battery cells 14 in each of twelve battery modules 12, using of any number of battery cells 14 and battery modules 12 is contemplated by the present disclosure. The battery cells 14 may be generally cylindrical, having a longitudinal axis, though any alternative shape known in the art may be employed, for example, polygonal shaped cells. As illustrated, the battery cells 14, having a longitudinal axis, may include a first end 24 at the top of the upright, generally cylindrical cells 14. Likewise, the battery cells 14 may include a second end 26 at the bottom of the upright, generally cylindrical cells 14. Battery cells 14 known in the art may include intentional fracture sites (not shown) on the underside or bottom of the second end 26 of the cells 14. Such a designated fracture site may, if thermal runaway occurs, allow the hot gasses or flames to escape the failed cell at a predetermined location and in a controlled, predictable manner. Specifically, such fracture sites may direct the escaping heat energy in a downward direction. The cells 14 may be, but are not limited to, ultra-capacitor cells, super capacitors cells, ultra-batteries, electrochemical cells such as, but not limited to, lithium-ion cells, lithium manganese cells, lithium titanate cells, lithium-iron phosphate cells, nickel-cadmium cells or nickel-metal hydride cells of different sizes.

The battery module 12 may include a module housing 20 in which the battery cells 14 are packed. While FIGS. 1 and 2 illustrate a simplified version of a module housing, such module housings are well known in the art and may include additional structures and features not illustrated in FIGS. 1 and 2, and not necessary for an understanding of the present disclosure. The battery module housing 20 may be considered an extension of the battery cells 14 it contains. The cells 14 should be packed in the module housing 20 such that they are not allowed to move rotationally, radially or axially as such movement can break inter-cell connections or wear through the protective case of the cell 14. The module housing 20 may be a generally box-shaped, partial enclosure that stabilizes the battery cells 14 in an upright manner as shown. The module housing 20 may be an integral structure having slots, recesses, collars or other structural components known in the art (not shown) to position the battery cells 14 inside the module housing 20. The battery cells 14 may be positioned in a uniform manner within the module housing 20, and the cells 14 may be positioned within the module housing 20 in a manner that minimizes the space required. Further, the module housing 20 may include any number of fastener means known in the art (not shown) for securing the battery module 12 to a battery pack assembly or other structure. As well known in the industry, the module housing 20 is typically made of a sufficiently rigid material that will protect the battery cells 14 in the case of severe vibrations or shock. Such materials are preferably flame resistant or retardant and lightweight, and may include, but are not limited to, plastic, resin and aluminum.

Turning to the structure of the battery pack tray 16, a relatively planar bottom wall 30 forms the base of the tray; and two sidewalls 32 and two end walls 34 form a frame thereon. While any shape/form that suits the particular application may be used, the illustrated battery pack tray 16 is a generally box-like structure that forms a compartment 36 for receiving the battery cells 14 or battery modules 12. Specifically, when received in the compartment 36 of the tray 16, the first end 24 of the cells 14 may extend outside of the tray compartment 36 while the second end 26 is enclosed within the tray compartment 36. The battery modules 12 and battery pack tray 16 may include corresponding fastener elements well known in the art (not shown) for securing and stabilizing the modules 12 within the tray 16. In addition, the battery pack tray 16 may include any number of fastener means known in the art for securing the battery pack 10 to a machine, a description of which is not necessary for an understanding of the present disclosure. The sidewalls 32 and end walls 34 may be secured to the bottom wall 30 using any number of means known in the art. For example, the various walls 30, 32, 34 may be attached using fasteners, or may be welded together. Alternatively, the walls 30, 32, 34 may be one integral, molded or machined structure. As illustrated in FIG. 2, the battery pack tray 16 may also include at least one divider wall 38 within the tray compartment 36, thereby creating two or more tray sub-compartments for receiving the battery cells 14 or battery modules 12.

The sidewalls 32 of the battery pack tray 16 may also include one or more spacers 40 extending therefrom. FIG. 2, for example, depicts two relatively flat spacers 40 extending lengthwise on and generally perpendicular to the sidewall 32. These spacer elements may be any shape or size, and may be attached to the sidewalls 32 using any manner known in the art. Incorporation of the spacers 40 on the sidewalls 32 of the tray 16 adds structural rigidity and stiffness to the battery pack tray 16, thereby increasing its durability. In addition, the spacers 40 prevent the battery cells 14 and/or the battery modules 12 from resting directly against the sidewalls 32, thereby further protecting the cells 14 and creating at least one elongated ventilation cavity 44 where battery cells 14 are not packaged. The ventilation cavity 44 may exist along the length of the tray compartment 36 between the spacers 40, the modules 12, the bottom wall 30 and the sidewalls 32, the ventilation cavity 44 having a function that is detailed further below. The various walls 30, 32, 34, 38 and spacers 40 of the battery pack tray 16 may be manufactured from any structurally sound, preferably corrosion resistant materials, including, but not limited to, steel, aluminum and flame resistant plastic.

Figure 3:
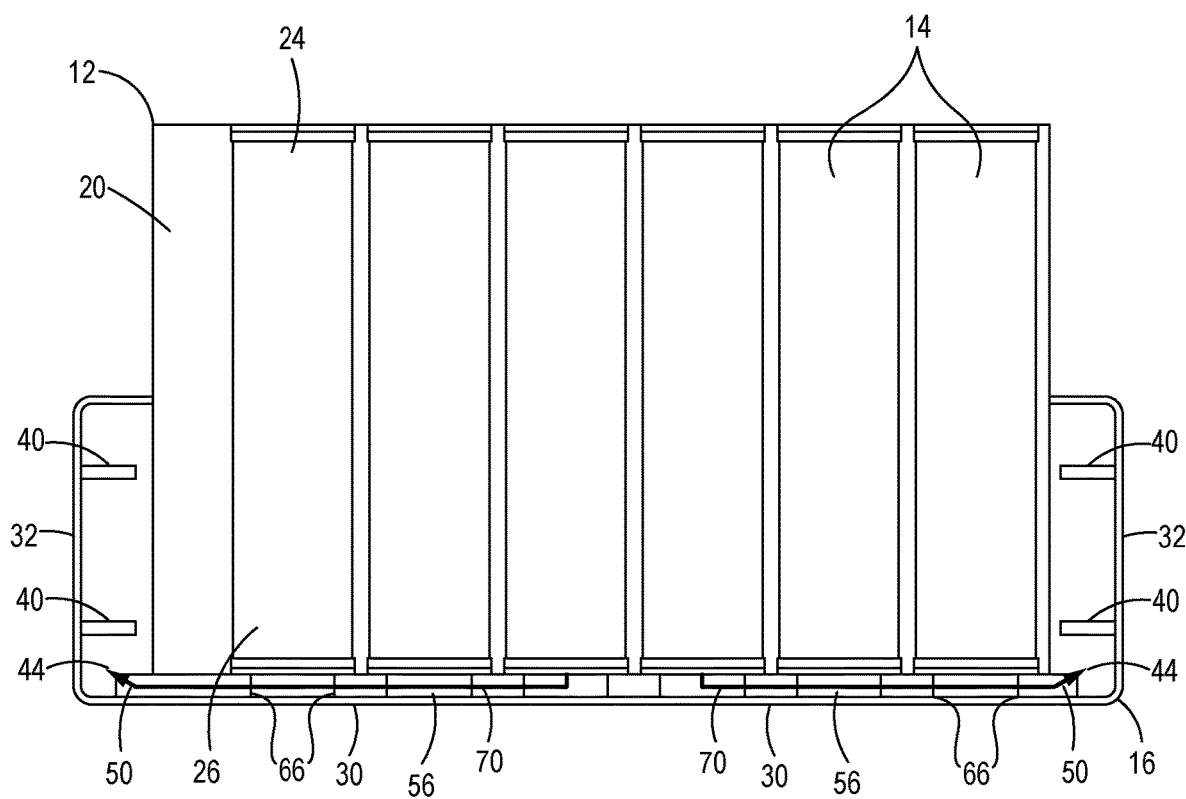
FIG. 3 is a cross-sectional view of the battery pack of FIG. 1 along a X-Y plane, according to certain embodiments of the present disclosure.
Figure 4:
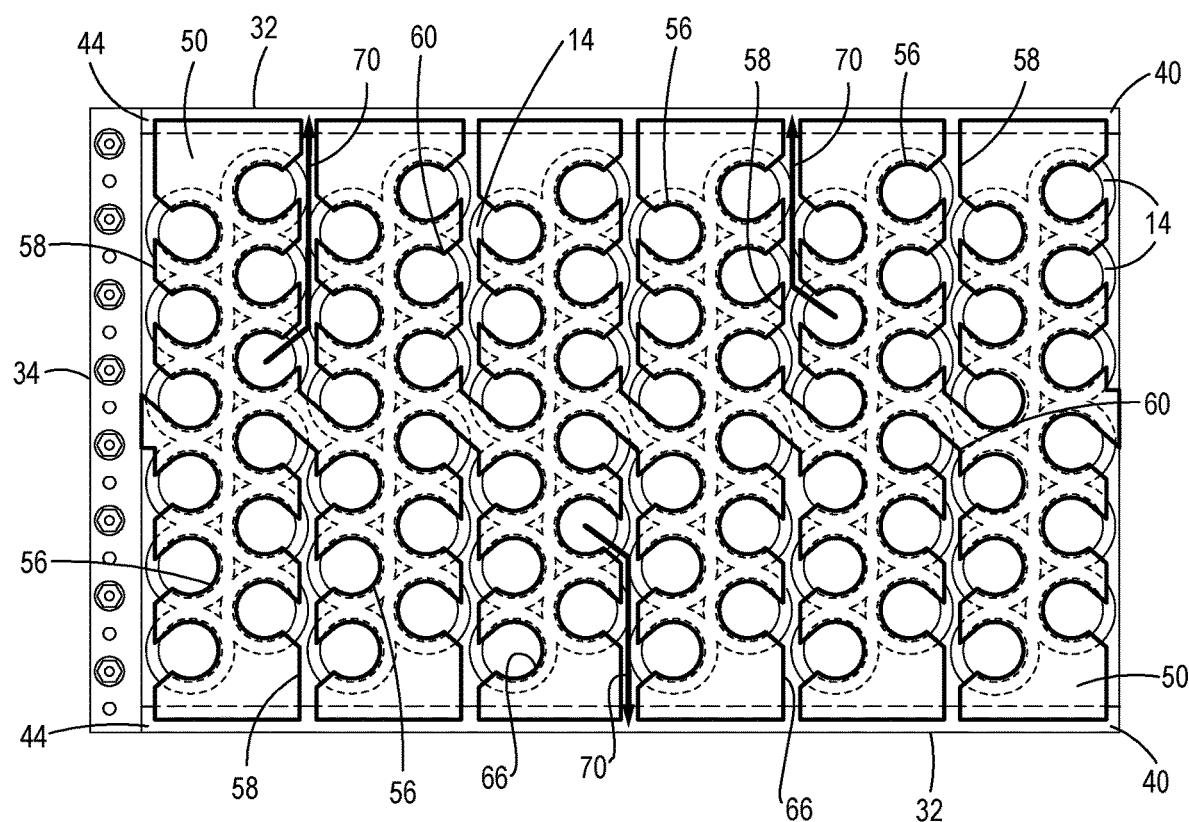
FIG. 4 is bottom view of a battery pack without a bottom wall, illustrating the overlay of a foam layer with battery cells, according to certain embodiments of the present disclosure.

As illustrated in the exploded view of the battery pack 10 of FIG. 2, a foam layer 50 is positioned between the battery modules 12 and the battery pack tray 16. Because the divider wall 38 may partition the compartment 36 into sub-compartments as described above, FIG. 2 illustrates two separate foam layers 50 for the compartment 36 of the tray 16. However, it should be understood that the tray 16 may receive a single foam layer or multiple foam layers, depending on the presence or absence of one or more divider walls 38. The foam layer 50 may be disposed on the bottom wall 30 of the tray 16; and the foam layer 50 may be sized to substantially cover the entire bottom wall 30. As illustrated in FIGS. 3 and 4, the foam layer 50, when disposed on the bottom wall 30, may cover nearly the entre width of the bottom wall 30 arriving proximate the sidewalls 32. As such, the foam layer 50 may extend beneath the spacers 40 and into the ventilation cavity 44. It is contemplated herein that the thickness of the foam layer 50 may vary depending on the particular application, and the size of the battery pack, the battery tray and ventilation cavity. The battery modules 12, when received and secured in the compartment 36 of the tray 16, may be disposed directly on the foam layer 50. As such, the foam layer 50, preferably having some degree of resiliency or elasticity, engages and applies force against the second end 26 of the battery cells 14 and/or the module housing 20 in a press-fit relationship. In this manner, the foam layer aids in stabilizing the batteries 14, thereby further protecting against damage from excessive vibrations or shock.

Figure 5:
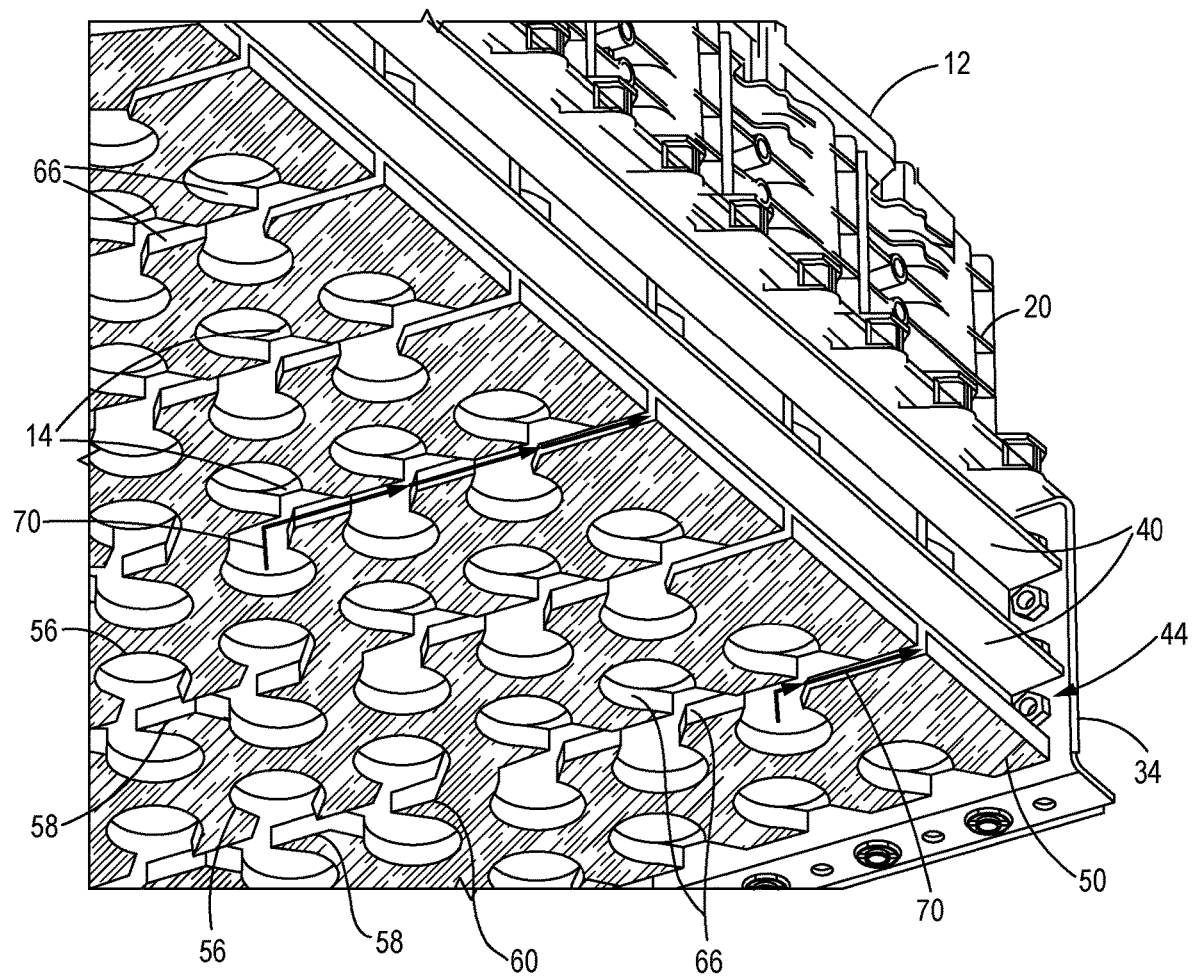
FIG. 5 is a perspective view of the bottom side of a battery pack without a bottom wall, according to certain embodiments of the present disclosure.

The structure of the foam layer 50 is best illustrated in FIGS. 2, 4 and 5. The foam layer 50 is relatively planar and may rest flat against the bottom wall 30 of the battery pack tray 16, and may include sidewall edges 52 and end wall edges 54. The foam layer 50 may be perforated with a plurality generally circular cutouts 56 and generally elongated cutouts 58, which make up a plurality of cutout trenches 60 that align in a predetermined manner with the battery cells 14 and battery modules 12 once the battery pack 10 is assembled. The cutout trenches 60 may be formed by die cutting the foam layer 50, or by any other means common in the industry. The illustrated cutout trenches 60 include generally circular cutouts 56 extending from generally elongated cutouts 58, though one with skill in the art will understand that other sizes and shapes may be utilized here. Indeed, the foam layer 50 may include cutout trenches 60 adapted to any battery cell shape and arrangement or battery module configuration. Whatever shape is employed for the cutout trenches 60 of the foam layer 50, at least a portion of the cutout trenches 60 should align with the second, bottom ends 26 of the battery cells 14. This arrangement is best illustrated in FIG. 4, which depicts a bottom view of the battery pack tray 16 without the bottom wall 30. As illustrated, each of the plurality of circular cutouts 56 aligns substantially with the second end 26 of a battery cell 14, while the elongated cutouts 58 extend between battery cells 14 of adjacent battery modules 12. It should also be understood that the elongated cutouts 58 may extend between battery cells 14 of the same battery module 12. In addition, the elongated cutouts 58 may stop short of the sidewall edges 52 of the foam layer 50, as illustrated in FIG. 2. Alternatively, the elongated cutouts 58 may extend all the way to the sidewall edges 52 of the foam layer 50, as illustrated in FIGS. 4 and 5. In both cases, the elongated cutouts 58 arrive to and are in fluid communication with the above-described ventilation cavity 44. The circular cutouts 56 and the elongated cutout 58 of each cutout trench 60 are in fluid communication and form the cutout trench 60, the plurality of which provides multiple heat energy evacuation routes from the battery cells 14, through the trenches 60, and into the ventilation cavity 44, as further detailed below. In this regard, fluid communication between cutouts 56, 58, 60 and the ventilation cavity 44 refers to the uninhibited, free passing potential of air, heat energy, gasses, fire and flames there between.

The foam layer 50 may be a flame retardant or flame resistant material capable of self-extinguishing after being exposed to flames. Further, the foam layer 50 may be any type of foam that can provide a consistent amount of force or pressure against the battery cells or modules. Preferably, the foam layer maintains high performance under extreme heat and remains resilient. A closed cell foam may be used for the foam layer, though any other materials known in the art are within the scope of this disclosure. In addition, while the cutout trenches 60 disclosed herein for heat energy evacuation are described as cutouts in a foam material, layers of other materials capable of achieving the same heat energy evacuation function may be used. For example, cutout trenches 60 may be incorporated in ceramic, plastic, fire resistant composite and steel layers, in which the cutout trenches 60 may effectively function as hot gas/flame evacuation routes and therefore prevent thermal propagation. Regardless of the material used, the present disclosure further contemplates replacing the foam layer 50 of battery pack 10 should it become damaged. Specifically, should its resiliency or elasticity be compromised, or should it become damaged by fire, the damaged foam layer may be replaced with a new, intact foam layer.

In order to further enhance the flame resistance of the foam layer 50, the cutout trenches 60 of the foam layer 50 may include an additional protective, fire resistant coating. Specifically, such a coating may be applied to and around edges 66 of the cutout trenches 60. The coating may be applied to each side of the foam layer 50 proximate the cutout trenches 60, as well as to the inner edge of the cutout trenches 60, which may be relatively perpendicular to the relatively planar sides of the foam layer 50 depending on the thickness of the foam layer. This additional protective coating may be any known flame resistant material that can be molded or applied around the edges 66. Such materials may include, but are not limited to, melamine or a resin form of polybenzimidazole. Alternatively, the additional protective coating may be stamped out aluminum or other protective materials applied around the edges 66. Such coating materials may be applied to the foam layer 50 using any means known in the industry. As such, the foam layer 50 may have an additional protection against heat energy 70 that may be associated with the thermal runaway of a battery cell 14. This additional coating of fire resistant material may be applied specifically to and around the edges 66 of the cutout trenches 60 because, as detailed above, portions of the cutout trenches 60 are substantially aligned with the second end 26 of the battery cells 14 where heat energy 70 in the form of hot gasses and/or flames may exit failed battery cells 14; and because the cutout trenches 60 function to direct and exhaust any such heat energy 70, as further detailed below. Alternatively, the entirety of the foam layer 50 may include this additional protective coating.

Though not specifically depicted in the figures of the present disclosure, one with skill in the art will understand that the battery pack 10 may include additional elements for thermal and physical protection of the battery cells 14, such as insulation and/or spacers between cells, additional insulation and/or plates above or below cells, cold plates, battery sleeves, cooling tubes, cooling jackets, clamps, collars, upper walls, covers and casings. Further, the battery pack 10 may be configured to be associated with a plurality of components such as, but not limited to, circuit boards, converters, inverters and controllers. In addition, battery packs 10 and the associated components may be enclosed in a single housing or in multiple housings (not shown).

Battery pack systems for mobile and stationary equipment generally contain a multitude of battery packs 10 and battery modules 12 arranged to achieve a target maximum and nominal voltage, and onboard energy. While not specifically illustrated in the figures, an additional safety feature contemplated in present disclosure is the physical compartmentalization and separation of battery packs 10 and modules 12 from one another in a battery pack system. Specifically, it is contemplated herein that the battery packs 10 and battery modules 12 may be packaged into four compartments, for example, that are isolated and separated from one another, though any number of compartments may be employed depending on the application. Structural elements may be included to accomplish this separation and isolation of battery packs 10 and modules 12 in a battery system. For example, a steel divider plate or other heavy-duty structural component may be used to both physically and thermally separated battery packs 10 in a battery system. Battery modules 12 may likewise be packaged into smaller subgroups and physically separated. For example, it is contemplated herein that no more than 3.5% of the total amount of batteries 14 are packaged adjacent to one another. The above-disclosed foam layer 50 having cutout trenches 60 may be incorporated into such compartmentalized battery packs and modules. This configuration, employing the compartmentalization of battery packs 10 and battery modules 12, may provide additional protection of the battery system by lowering the amount of energy in any one compartment, and by spacing the compartments out across the battery system or machine, thereby preventing an issue in one compartment from affecting the entire battery system. For example, should thermal runaway or the catastrophic event of fire propagation throughout a battery pack occur, the presently disclosed compartmentalization of battery packs 10 and modules 12 may prevent damage to or destruction of the entire battery system.

Figure 6:
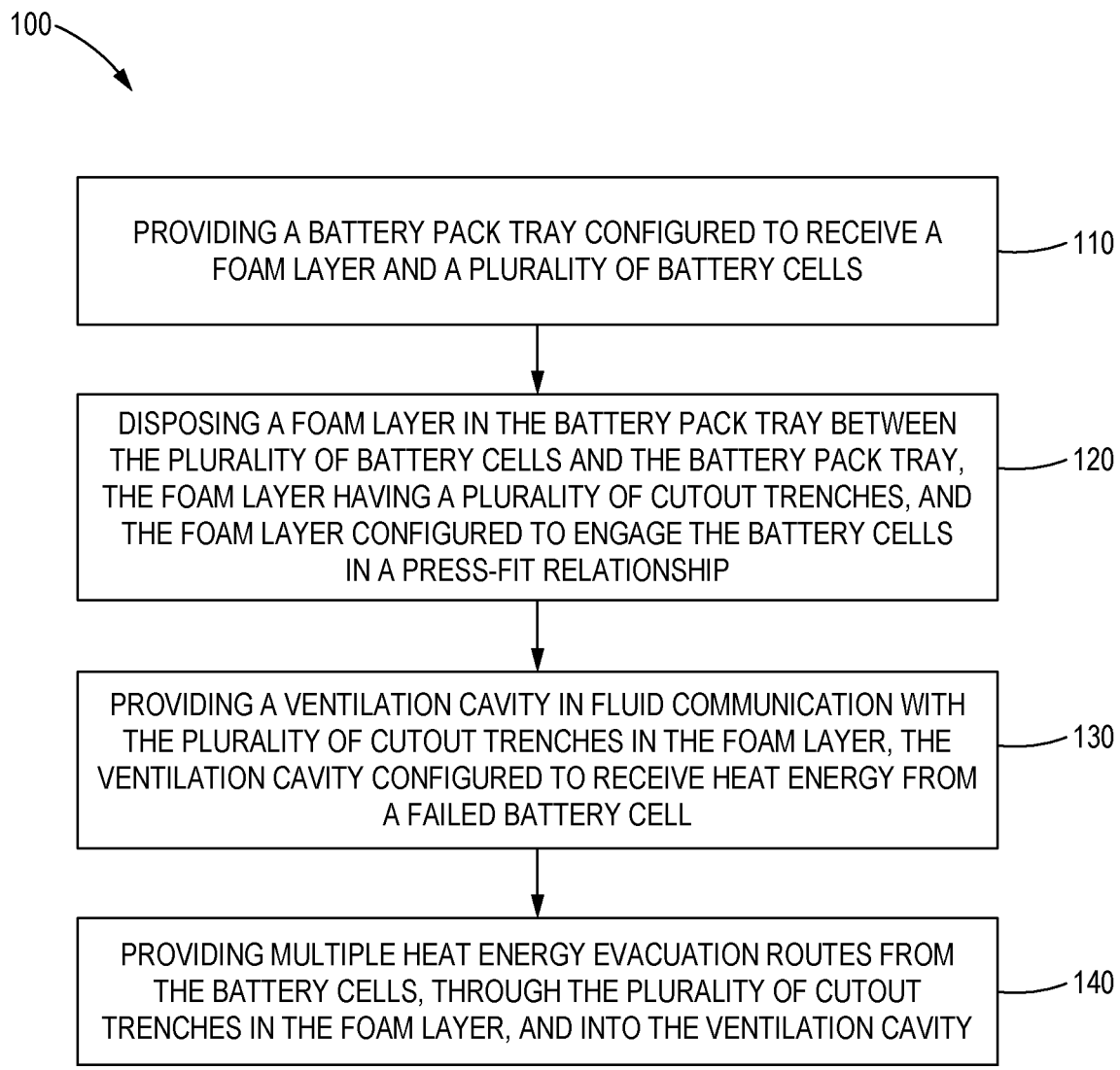
FIG. 6 is a flowchart illustrating a method of preventing thermal propagation in a battery pack, according to certain embodiments of the present disclosure.

FIG. 6 shows a flow chart for a method of preventing thermal propagation in a battery pack. FIG. 6 is discussed in more detail in the following section to further illustrate the disclosed methods and concepts.

INDUSTRIAL APPLICABILITY

The presently disclosed battery packaging assembly having safety features that reduce the potential for thermal propagation may have applicability in mobile or stationary equipment. Battery packs utilizing the disclosed battery packaging assembly may be used to power any hybrid or electric drive vehicles, as well as stationary power generation. For example, a machine such as a hydraulic excavator, an articulated truck, a locomotive, a passenger vehicle, a mining truck, an agricultural machine or an electric generator may be powered by large battery packs carried onboard. In addition to such conventional uses for battery packs, underground mining operations are increasingly employing battery pack power, which may reduce the required mine ventilation and cooling, thereby increasing the overall efficiency of the mining operation.

Because high amounts of battery energy are built into such heavy-duty equipment in order to maximize performance and productivity, precautions must be taken to protect the physical stability and integrity of the battery pack, as well as the thermal stability. Specifically, such batteries should be packaged in a way that reduces the amount of vibrations and shock inflicted thereon. This may include the incorporation of insulative and/or other shock-absorbing materials in a battery module or battery pack, as well as other structural components intended to stabilize the batteries. The need for this type of protection is magnified in the harsh environments of underground mining operations. In addition, as much heat may be generated in high-energy battery packs, various methods for cooling battery packs may be employed, such as cold plates, cooling tubes and ventilation. These various efforts to stabilize batteries are all aimed, among other things, at avoiding thermal runaway in a battery cell, which may be due to a physical shock or overheating of the cell, and may result in the release of hot gasses and flames from the failed cell. As explained above, thermal runaway in single battery cell of a conventional battery pack may trigger fire propagation throughout the entirety of the battery pack, thereby causing significant damage to the equipment and possibly endangerment to personnel. The disclosed battery packaging assembly and methods avoid or lessen this risk of fire propagation by providing evacuation routes for heat energy in the form of hot gasses or flames exiting failed cells while also offering additional physical stabilization of batteries in a battery pack.

Turning to FIG. 6, a flow chart for a method 100 of preventing thermal propagation in a battery pack is shown. The disclosed method 100 begins with, at step 110, providing a battery pack tray 16 configured to receive a foam layer 50 and a plurality of battery cells 14. As described above with reference to FIGS. 1 and 2, the battery pack tray 16 may include sidewalls 32, end walls 34 and a bottom wall 30, which together enclose the compartment 36 that receives the foam layer 50 and the plurality of battery cells 14 or battery modules 12. Step 120 of the disclosed method 100 requires disposing the foam layer 50 in the battery pack tray 16 between the plurality of battery cells 14 and the battery pack tray 16, the foam layer 50 having a plurality of cutout trenches 60, and the foam layer 50 configured to engage the battery cells 14 in a press-fit relationship. Specifically, as illustrated in FIGS. 2 and 3, the foam layer 50 is sandwiched between the battery modules 12 and the bottom wall 30 in a press-fit relationship. This foam layer, having resiliency and shock-absorbing characteristics, applies force against the bottom of the modules 12 or cells 14, thereby helping to physically stabilize the battery cells 14 within the battery pack tray 16 and protect the cells from excessive vibrations that may be common in harsh working environments. As illustrated in FIGS. 2 and 4, the foam layer 50 also includes cutout trenches 60, which may include a plurality of generally circular cutouts 56 in fluid communication with a plurality of generally elongated cutouts 58. While the exact shape of the cutout trenches 60 may vary depending on the battery configuration or module being used, the cutouts 56 should align substantially with the second, bottom end 26 of the battery cells 14, as best depicted in FIGS. 3 and 4. Likewise, the elongated cutouts 58 should extend towards the sidewall edge 52 of the foam layer 50 and away from the battery cells 14. These cutout trenches 60 may receive heat energy 70 in the form of flames or hot gasses from failed battery cells 14, and thereafter provide an evacuation route for guiding the heat energy 70 away from adjacent cells 14, thereby decreasing the risk of thermal propagation throughout the entirety of the battery pack 10, as detailed further below.

The disclosed method 100 of preventing thermal propagation in a battery pack further requires, at step 130, providing a ventilation cavity 44 in fluid communication with the plurality of cutout trenches 60 in the foam layer 50, the ventilation cavity 44 configured to receive heat energy 70 from a failed battery cell 14. The ventilation cavity 44 is described above and illustrated most clearly in FIGS. 2 and 3. Specifically, the ventilation cavity 44 is an area within the battery pack tray 16 where battery cells 14 or modules 12 are not packaged. More specifically, the sidewalls 32 may include spacer elements 40 that extend in a relatively perpendicular manner from the sidewalls 32 and into the tray compartment 36. These spacers 40 may not only provide beneficial additional rigidity to the battery pack tray 16, the spacers 40 may physically block the batteries 14 or battery modules 12 from resting directly against the sidewalls 32. As such, ventilation cavities 44 may be provided between the spacers 40, the modules 12, the bottom wall 30 and the sidewalls 32. The ventilation cavities 44 may extend along the length of the tray sidewalls 32, and as best illustrated in FIGS. 3, 4 and 5, the cutout trenches 60 of the foam layer 50 are in fluid communication with the ventilation cavity 44. Fluid communication between cutouts 60 and the ventilation cavity 44 refers to the uninhibited, free passing potential of air, heat energy, gasses, fire and flames there between. This configuration allows for heat energy 70 exhausted from a failed cell 14 to be guided away from the battery cells 14 and ultimately into the ventilation cavities 44 where it may be extinguished or be otherwise dispersed while also being contained. As such, the ventilation cavities 44 may function as evacuation channels for heat energy 70 received in the cutout trenches 60 from a cell undergoing thermal runaway.

Further in this regard, the disclosed method 100 of preventing thermal propagation in a battery pack 10 requires, at step 140, providing multiple heat energy evacuation routes from the battery cells 14, through the plurality of cutout trenches 60 in the foam layer 50, and into the ventilation cavity 44. FIGS. 3, 4 and 5 illustrate exemplary heat energy evacuation routes provided by the presently disclosed configuration. Specifically, when a battery cell 14 undergoes thermal runaway due to, for example, a short circuit, physical damage or overheating, heat energy 70 in the form of extremely hot gasses or flames may be exhausted from the second, bottom end 26 of a battery cell 14. As described above, fracture sites (not shown) may be provided in the underside of the battery cells in order to control the release of the heat energy 70 and predetermine its initial direction. This second end 26 of the battery 14, from which the heat energy 70 escapes during thermal runaway, may be substantially aligned with the relatively circular cutouts 56 of the cutout trenches 60. As such, the heat energy 70 is exhausted into the circular cutouts 56 of trenches 60 and subsequently routed through the elongated cutouts 58 of trenches 60 and into the ventilation cavities 44, as indicated by the arrows associated with the heat energy 70 in FIGS. 3, 4 and 5. The heat energy flow through these disclosed evacuation routes guides the potentially damaging heat energy 70 away from the battery cells 14. The routes of the heat energy 70 illustrated in FIGS. 4 and 5 direct the heat energy 70 from the circular cutouts 56 and into elongated cutouts 58 that extend between battery modules 12. In this manner, because the module housings 20 may insulate the battery cells 14, the evacuation routes between modules 12 may offer an additional degree of thermal protection. In addition, by avoiding heat buildup in the battery module interior, this configuration lessens the exposure of other batteries 14 in the same module 12 to the heat energy 70 escaping a failed adjacent cell. Alternatively, depending on the foam layer employed, the elongated cutouts 58 through which the heat energy 70 is directed may extend between batteries 14 of the same module 12. In all cases, the cutout trenches 60 operate to guide the escaping heat energy 70 away from battery cells 14 and into the ventilation cavity 44 where it is safely contained without provoking thermal runaway in or otherwise damaging other battery cells 14, and therefore avoiding the risk of thermal propagation throughout the battery pack.

The foam layer 50 is preferably constructed from a flame retardant or flame resistant material, and therefore should not be significantly affected or damaged by escaping heat energy 70. Moreover, where an additional protective coating such as that disclosed herein is applied to the foam layer 50, the foam layer 50 should remain relatively unharmed through usage, even after numerous occurrences of thermal runaway. It is, however, contemplated herein that the disclosed foam layer 50 may be a replaceable part. As such, should a foam layer 50 become damaged through use, it may easily and affordably be replaced by an intact, new foam layer without having to replace additional elements of the battery pack 10. In this case, the method 100 of preventing thermal propagation in a battery pack may include the additional step of replacing the foam layer 50 after one or more battery failures occur. Likewise, the foam layer 50 may be replaced if its physical resiliency is compromised through extended use in harsh conditions. Notably, replacing the foam layer 50 is much less expensive than the replacement of an entire battery pack 10 having been destroyed by the uncontrolled spread of thermal propagation therein.

The disclosed battery packs 10 may be utilized in any conventional arrangement of battery packs in mobile or stationary equipment. Likewise, they may be employed in the above-described compartmentalized battery systems where individual battery packs 10 and battery modules 12 may be separated and isolated from one another. In this case, the battery packs 10 may be afforded with additional physical and thermal protection.

The improved battery packaging assembly and methods disclosed herein resolve the issue of having a single cell catastrophic failure evolve into thermal propagation throughout the entire battery system. Specifically, the incorporation of the disclosed foam layer in a press-fit relationship with batteries of a battery pack not only provides additional stability and protection of battery cells, the disclosed foam layer and battery pack tray provide quick and efficient evacuation paths for heat energy from failed cells away from intact cells of the battery pack and into a ventilation cavity in the battery pack where the heat energy is safely extinguished or dispersed. The disclosed systems and methods therefore provide an important safety measure for any application that employs battery packs, and especially for equipment utilized in the harsh environments of mining operations where the batteries may be exposed to excessive shocks and vibrations that may provoke thermal runaway.

While aspects of the present disclosure have been particularly shown and described with reference to the embodiments above, it will be understood by those skilled in the art that various additional embodiments may be contemplated by the modification of the disclosed systems and methods without departing from the spirit and scope of what is disclosed. Such embodiments should be understood to fall within the scope of the present disclosure as determined based upon the claims and any equivalents thereof.

What is claimed is:

1. A battery packaging assembly, comprising:
    a foam layer having a plurality of cutout trenches, the foam layer configured to engage battery cells in a press-fit relationship;
    a tray configured to receive the foam layer, the tray enclosing a compartment configured for receiving a plurality of battery cells; and
    a ventilation cavity in fluid communication with the plurality of trenches of the foam layer.

2. The battery packaging assembly of claim 1, wherein the tray includes a relatively planar bottom wall and sidewalls, and wherein the foam layer is disposed on the bottom wall.

3. The battery packaging assembly of claim 2, further comprising a spacer disposed on a sidewall of the tray, the spacer partially forming the ventilation cavity.

4. The battery packaging assembly of claim 1, wherein the tray is configured to receive a plurality of battery cells combined in a plurality of battery module housings.

5. The battery packaging assembly of claim 1, wherein the cutout trenches comprise a plurality of circular cutouts in fluid communication with the ventilation cavity, each circular cutout configured to align substantially with a single battery cell received in the tray.

6. The battery packaging assembly of claim 1, wherein the foam layer further comprises a protective coating proximate the edges of the cutout trenches.

7. The battery packaging assembly of claim 1, wherein the foam layer is replaceable.

8. A battery pack, comprising:
    a plurality of battery modules containing a plurality of battery cells;
    a foam layer having a plurality of cutout trenches, the foam layer configured to engage the battery modules in a press-fit relationship;
    a tray configured to receive the foam layer, the tray enclosing a compartment configured for receiving the plurality of battery modules; and
    a ventilation cavity in fluid communication with the plurality of trenches of the foam layer.

9. The battery pack of claim 8, further comprising multiple heat energy evacuation routes from the battery cells, through the cutout trenches of the foam layer, and into the ventilation cavity.

10. The battery pack of claim 8, wherein the tray includes a relatively planar bottom wall and sidewalls, and wherein the foam layer is disposed on the bottom wall between the battery modules and the bottom wall.

11. The battery pack of claim 10, further comprising a spacer disposed on a sidewall of the tray, and wherein the ventilation cavity is formed between the spacer, the sidewall, the bottom wall and the battery modules.

12. The battery pack of claim 8, wherein the cutout trenches comprise a plurality of circular cutouts in fluid communication with the ventilation cavity, each circular cutout configured to align substantially with a single battery cell of a module received in the tray.

13. The battery pack of claim 8, wherein the foam layer further comprises a protective coating proximate the edges of the cutout trenches.

14. The battery pack of claim 8, wherein the foam layer is replaceable.

15. A method of preventing thermal propagation in a battery pack, comprising the steps of:
    providing a battery pack tray configured to receive a foam layer and a plurality of battery cells;
    disposing a foam layer in the battery pack tray between a plurality of battery cells and the battery pack tray, the foam layer having a plurality of cutout trenches, and the foam layer configured to engage the battery cells in a press-fit relationship;
    providing a ventilation cavity in fluid communication with the plurality of cutout trenches of the foam layer, the ventilation cavity configured to receive heat energy from a failed battery cell; and providing multiple heat energy evacuation routes from the battery cells, through the plurality of cutout trenches of the foam layer, and into the ventilation cavity.

16. The method of claim 15, further comprising the step of replacing the foam layer after one or more battery failures occur.

17. The method of claim 15, wherein the step of providing a ventilation cavity comprises placement of a spacer element to separate the battery cells from a sidewall of the battery pack tray.

18. The method of claim 15, wherein the cutout trenches comprise a plurality of circular cutouts in fluid communication with the ventilation cavity, each circular cutout configured to align substantially with a single battery cell received in the tray.

19. The method of claim 15, wherein the plurality of battery cells received in the battery pack tray are combined into a plurality battery module housings.

20. The method of claim 15, wherein the battery pack is disposed in a machine in an arrangement that isolates the battery pack from additional battery packs in the machine.

* * * * *